(12) United States Patent
Maxwell et al.

(10) Patent No.: US 7,772,022 B2
(45) Date of Patent: Aug. 10, 2010

(54) METHOD OF ALIGNING OPTICAL COMPONENTS WITH WAVEGUIDES

(75) Inventors: Graeme Douglas Maxwell, Ipswich (GB); Philip Richard Townley, Colchester (GB); Robert Campbell McDougall, Befordshire (GB)

(73) Assignee: The Centre For Integrated Photonics Limited, Ipswich (GB)

( * ) Notice: Subject to any disclaimer, the term of this patent is extended or adjusted under 35 U.S.C. 154(b) by 0 days.

(21) Appl. No.: 11/916,348

(22) PCT Filed: Jun. 5, 2006

(86) PCT No.: PCT/GB2006/002056
§ 371 (c)(1),
(2), (4) Date: Jul. 14, 2008

(87) PCT Pub. No.: WO2006/129123
PCT Pub. Date: Dec. 7, 2006

(65) Prior Publication Data
US 2008/0311693 A1   Dec. 18, 2008

(30) Foreign Application Priority Data
Jun. 3, 2005   (GB) ................................ 0511300.6

(51) Int. Cl.
*H01L 21/00* (2006.01)
(52) U.S. Cl. ..................... 438/31; 438/29; 257/E21.705
(58) Field of Classification Search .................. 438/31, 438/29; 257/466, 464, E21.705, E31.038, 257/E31.095
See application file for complete search history.

(56) References Cited

U.S. PATENT DOCUMENTS

| 5,321,786 A | 6/1994 | Valette et al. .................. 385/92 |
| 2001/0029755 A1* | 10/2001 | Takahashi et al. ............. 65/386 |

(Continued)

FOREIGN PATENT DOCUMENTS

EP   0977061   2/2000

(Continued)

OTHER PUBLICATIONS

International Search Report for corresponding application No. PCT/GB2006/000357 completed Sep. 18, 2006.

(Continued)

*Primary Examiner*—Caridad M Everhart
(74) *Attorney, Agent, or Firm*—Renner, Otto, Boisselle & Sklar, LLP

(57) ABSTRACT

A method of fabricating a photonic device comprises the steps of providing a core pattern of waveguide core material (1) on a base layer (3) and applying a cladding layer (2) over the core material 1 and the base layer (3). The height of the surface of the cladding layer (2) over the base layer (3) varies in dependence on the pattern of core material (1). The core pattern is designed with at least two reference regions, each having a width w that is selected to provide a peak of the cladding layer (2) with a predetermined height h1 over each reference region. The core pattern is further designed such that a line between the peaks of the reference regions is higher than any intervening peaks of the cladding layer, whereby the peaks of the reference regions provide a vertical alignment reference.

6 Claims, 3 Drawing Sheets

U.S. PATENT DOCUMENTS

| | | | |
|---|---|---|---|
| 2003/0044151 A1* | 3/2003 | Zhong et al. | 385/129 |
| 2003/0091262 A1 | 5/2003 | Maxwell | 385/14 |
| 2004/0165829 A1 | 8/2004 | Botet et al. | 385/48 |
| 2004/0247248 A1 | 12/2004 | Fasham | 385/52 |

FOREIGN PATENT DOCUMENTS

| | | |
|---|---|---|
| EP | 1343232 | 9/2003 |
| JP | 61-191093 | 8/1986 |
| JP | 07-015092 | 1/1995 |

OTHER PUBLICATIONS

Maeda et al., "Photonic integrated Circuit Combining Two GaAs Distributed Bragg Reflector Laser Diodes for Generation of the Beat Signal", Dec. 6 1991, 3 pages.

* cited by examiner

METHOD OF ALIGNING OPTICAL COMPONENTS WITH WAVEGUIDES

This application is a national phase of International Application No. PCT/GB2006/002056 filed Jun. 5, 2006 and published in the English language.

FIELD OF THE INVENTION

This invention relates to a method of fabricating a photonic device including at least one waveguide, and in particular to a method of aligning optical components with waveguides.

BACKGROUND OF THE INVENTION

There are approaches used for passive hybrid assembly of semiconductor optical components with planar waveguides, such as that used by Blauvelt in U.S. patent application US2004/0052467 that uses evanescent (vertical in this case) coupling to an underlying passive waveguide wafer. This approach is limited to vertical evanescent coupling of components and precludes the straightforward integration of non-waveguiding components such as free space optical isolators and thin film filters. In addition, the alignment technique means that the cladding layer of the waveguide wafer has to be both very thin to enable the evanescent coupling to take place and substantially flat.

An alternative is that disclosed by Maxwell in U.S. Pat. No. 6,778,718 relating to the hybrid integration of active semiconductor components, whereby the top of a planar surface of a waveguide cladding provides the vertical alignment reference frame and mechanical end stops are used to provide lateral positioning. Light is end-fire coupled into the waveguide device through a hole manufactured into the waveguide layer. This approach again talks of a planar surface for the alignment.

In reality, however, the top surface of a cladding over waveguides may not always be planar and in some situations the cladding surface of the waveguide device may have undulations or bumps above the regions which define the waveguide core.

Fasham in GB-A-2,379,995 used an active alignment approach for hybrid integration and there is a view expressed in the documents by Fasham and Blauvelt which maintains that a passive approach for vertical positioning of additional devices placed on a non-planar surface is not possible without additional processing steps to planarise the surface. These undulations would have to be removed through a process such as chemical-mechanical polishing (CMP) to provide a planar surface for alignment, or some level of active alignment would have to be undertaken to compensate for the non-planar surface. In addition, using a planar surface as described by Maxwell and Blauvelt, increases the susceptibility of the alignment process to contamination from dust or dirt on the cladding surface which can compromise the alignment accuracy. In both cases mentioned, the vertical reference frame for alignment is the planar surface of the cladding of the waveguide device, and in both cases, there are limitations associated with the requirements for a planar surface.

The present invention, at least in preferred embodiments, seeks to enable passive alignment techniques to be adopted without the need to planarise the surface of the waveguide.

SUMMARY OF THE INVENTION

Accordingly, this invention provides a method of fabricating a photonic device including at least one waveguide. The method comprising the steps of providing a core pattern of waveguide core material on a base layer, and applying a cladding layer over the core material and the base layer. The height of the surface of the cladding layer over the base layer varies in dependence on the pattern of core material. The core pattern is designed with at least two reference regions, each having a width that is selected to provide a peak of the cladding layer with a predetermined height over each reference region. The core pattern is further designed such that a line between the peaks of the reference regions is higher than any intervening peaks of the cladding layer, whereby the peaks of the reference regions provide a vertical alignment reference.

The approach of the invention allows the surface of a cladding layer containing bumps to be used as a vertical reference frame for passive alignment of additional optical components without the need for processing steps to planarise the surface or the requirement for active alignment or the need for thin cladding layers. The invention enables optical and optoelectronic devices of various types to be integrated onto an optical circuit board and finds application in components and systems required for telecommunications, sensing, computing, instrumentation and lab-on-a-chip.

The peaks of the reference regions may have the same predetermined height over the base layer. In this way, the line between the peaks is parallel to the base layer. The widths of the reference regions may be the same. In general, this will result in reference regions of the same height.

The method may further comprise the step of positioning a mounting device, such as a submount, in contact with the peaks of both reference regions to locate a component vertically with respect to the waveguide core. Thus, an optical component being integrated into a waveguide may be housed on a separate submount designed to be integrated in the vertical direction through the use of vertical positioning on bumps. The bumps may be placed in an appropriate pattern around the site for hybrid integration to eliminate any tilt in a submount placed on top.

Lateral alignment may be provided by patterning physical upstands (projections) on the surface of the cladding which act as mechanical end stops for submounts or components that have precisely defined edges defined through processes such as etching, dicing, cleaving or machining.

A hole may be made in the waveguide substrate which allows the insertion of the component to be integrated in the waveguide, as in U.S. Pat. No. 6,778,718. End-fire coupling may be used between the waveguide and the inserted optical component. This end-fire coupling approach allows the integration of different optical components that may use free space propagation such as isolators and thin film filters which the Blauvelt approach does not, as well as active components such as semiconductor lasers, semiconductor optical amplifiers or passive planar waveguides made using a different material system.

Furthermore, because of the passive assembly, this approach allows the integration of multiple elements in a serial fashion on a common waveguide wafer, providing the optical equivalent of an electrical printed circuit board. Using that analogy, the planar waveguide forms the optical equivalent of the electrical circuit on the circuit board, and different optical components are integrated depending on their function, made using a material system appropriate to that function.

The process disclosed for defining the vertical alignment reference position depends upon the controlled and repeatable fabrication of bumps of a specific height in the surface of the cladding which act as pillars to support the vertical positioning of additional components placed thereon. These bumps are fabricated by patterning large blocks in the core layer of the waveguide. The width of the block determines the height of the cladding bump above it. The width of the block that is used also has to take into consideration both the waveguide dimensions used for guiding the optical signal and waveguide pattern (density) in the circuit in proximity to the area where the hybrid integration is to take place. The blocks should also be positioned so as not to affect the optical properties of the waveguide.

Thus, the invention, at least in the preferred embodiments, provides a technique which allows the surface of a cladding layer containing bumps to be used as a vertical reference frame for passive alignment that does not require post cladding planarisation techniques. Furthermore, the sensitivity of placement of a hybrid optical component to dust and other contamination on the waveguide surface is reduced by using a controlled non-planar surface.

The waveguide may be fabricated using silica based materials.

The invention extends to a waveguide core pattern adapted for use in the method described.

BRIEF DESCRIPTION OF THE DRAWINGS

An embodiment of the invention will now be described by way of example only and with reference to the accompanying drawings, in which.

DETAILED DESCRIPTION OF AN EMBODIMENT

Figure 1:
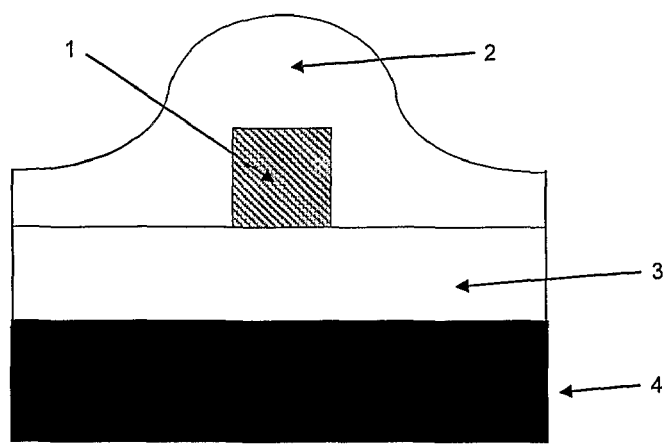
FIG. 1 is a cross section of a patterned core layer and cladding bump.

Square (or rectangular) waveguide cross sections are common in planar waveguide devices, where the core cross section can have linear dimensions of the order of a few to several microns in each direction for single mode operation. FIG. 1 shows a typical configuration of such a planar waveguide device. The waveguide core 1 sits on a buffer layer 3 formed of a material of lower refractive index than the waveguide core 1. The buffer layer 3, in turn, sits on a suitable substrate 4. Typically, the waveguide core 1 is applied to the buffer layer 3 as a continuous layer and portions of the waveguide material are removed, for example by etching, to leave a pattern of core material. For this reason, the each waveguide core has the same height above the buffer layer 3.

A uniform thickness of cladding layer 2 is deposited on top of the waveguide core 1 (using one of a number of possible deposition techniques). The cladding layer 2 is substantially planar in regions that do not contain a core pattern, where the cladding 2 is deposited directly on the buffer layer 3. However, the cladding layer 2 is typically curved and raised above the planar level by a few microns in the areas that contain the waveguide core 1. Thus, above the waveguide core 1, the cladding layer 2 forms a "bump". This is considered to be a problem (see for example Blauvelt or Fasham) when one wishes to use the surface of the cladding layer 2 as a vertical reference frame for alignment of additional components with the required micron scale accuracy.

Figure 2:
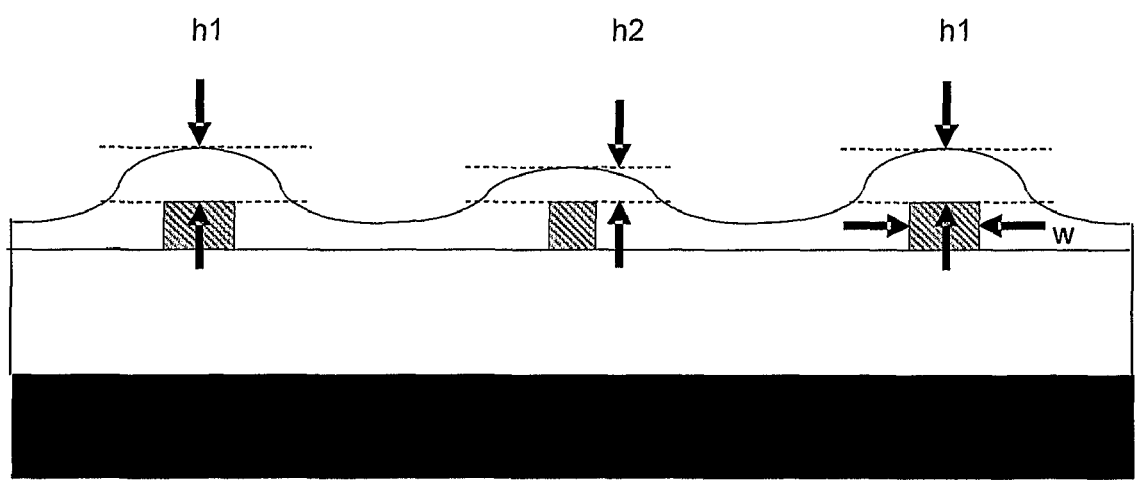
FIG. 2 is a cross section of a patterned core layer and cladding bumps for different width waveguide blocks.
Figure 3:
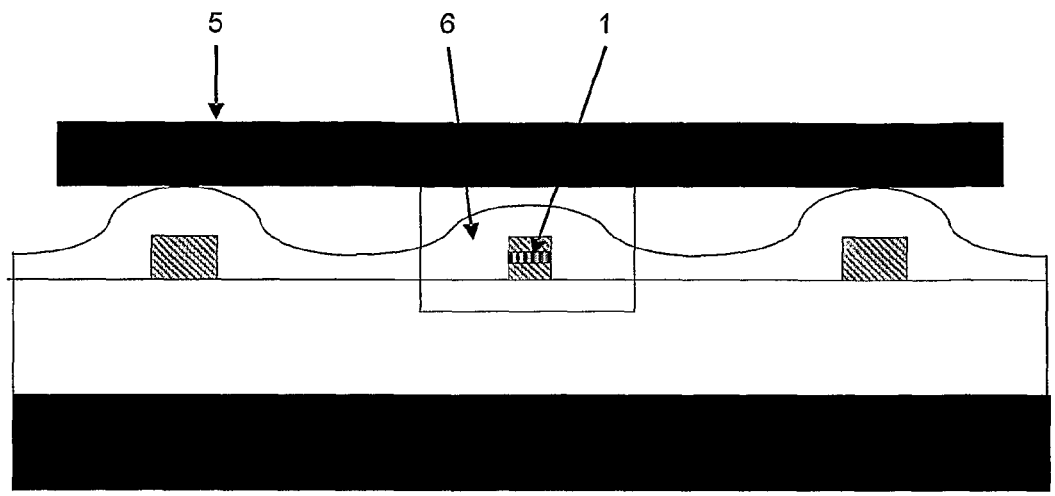
FIG. 3 is a cross section of a submount containing an optical component whereby the vertical positioning of the components is determined by the height of the bumps in the cladding.

As shown in FIG. 2, as the core width increases, the height of the cladding bump increases in a controlled and repeatable manner. The exact value, depends on additional factors of cladding composition and the specific details of the cladding process. If one fixes the cladding composition and the process, then one can simply vary the width of the core block w to set the height h of the cladding bump. This controlled and repeatable process allows one to use a non-planar surface for highly precise passive alignment in the vertical plane.

As shown in FIG. 2, if one now places a submount 5 containing a component 6 to be aligned to the core 1 of the waveguide on top of the cladding surface 2, the vertical position will be set by the bumps above the widest blocks in the cladding. In addition, by appropriately placing the blocks under the submount, one can ensure that the submount is horizontal and does not suffer any tilt. Additional features need to be added to provide lateral positioning and an interface for the end-fire coupling as in U.S. Pat. No. 6,778,718 by Maxwell.

Figure 4:
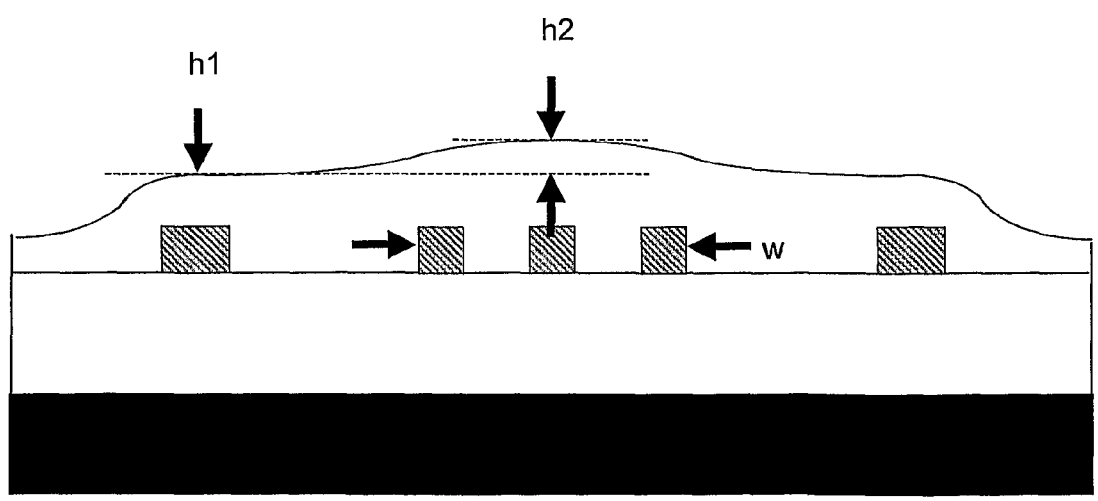
FIG. 4 is a cross section of an array of patterned core waveguides between two cladding bumps.

In deciding the width of positioning block to use, one must also take into consideration the density of waveguides in the vicinity. As the density of waveguides increases and the gap between the waveguides reduces, the height of the cladding bump begins to resemble that of a single block with a width comparable to the summation of the individual waveguides. This is shown in FIG. 4, where the waveguide is of sufficient number and having a sufficiently small gap separation that it is behaving like a single block. The cladding bump height h2 is now greater than that of the alignment block h1, and would now not enable the alignment blocks to function as required. This can be accommodated in the design of the block width and of the waveguide pattern.

Figure 5:
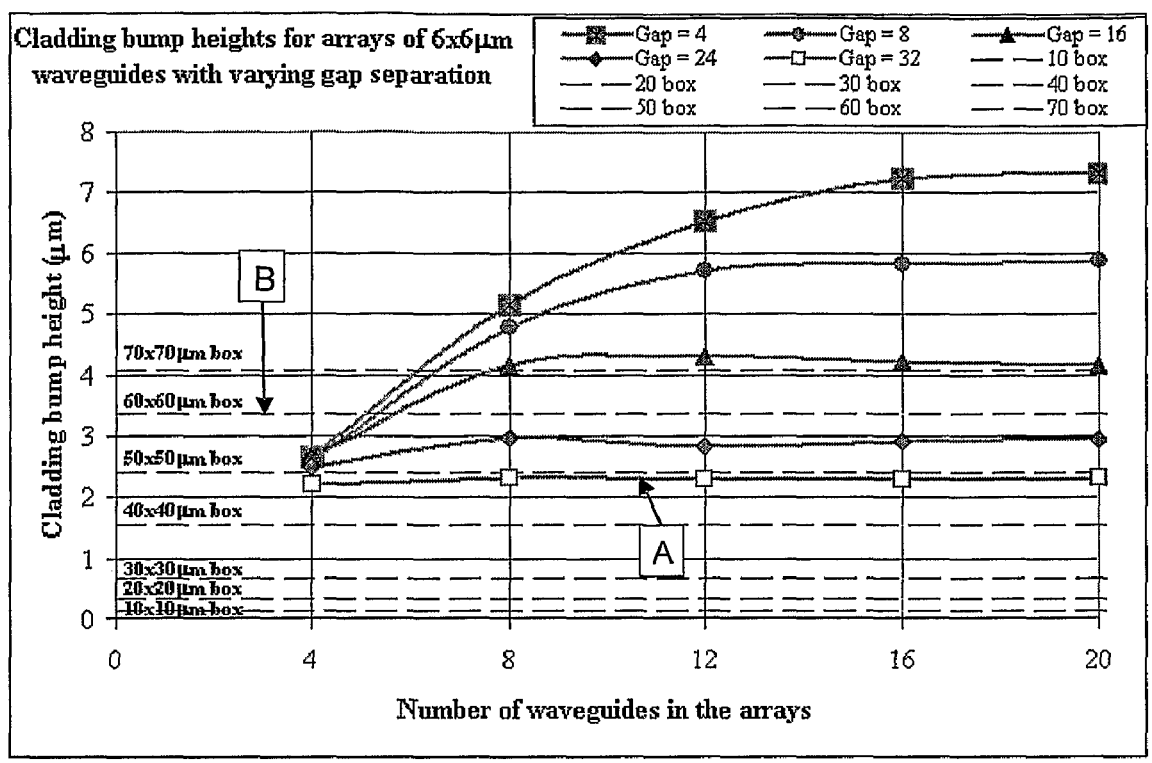
FIG. 5 is a graph showing the relationship between cladding bump heights and waveguide arrays with varying gap separation.

FIG. 5 graphically represents the variation in cladding bump height over an array of waveguides of varying number in the array and with varying gap between the waveguides. As the number of waveguides in the array increases, the height of the cladding bump increases asymptotically to a peak value. For example, line A shows the curve for arrays of waveguides with a gap between each one of 32 microns. The cladding bump height above this array reaches a maximum value of ~2.4 microns above the cladding in areas away from waveguides. For vertical alignment control, a block width would need to be chosen which produces a cladding bump height which is higher than the asymptote for the cladding bump height above the waveguides.

The horizontal lines on the graph in FIG. 5 indicate cladding bump heights for varying block widths. For example, line B shows the cladding bump height for a square block that is 60 microns wide. The bump height is ~3.4 microns, and will thus be higher than the waveguide arrays. It can therefore provide the vertical alignment reference required. There are examples on the graph of array sizes and gaps which have cladding bump heights of several microns (for example, the curve for waveguides with a gap of 4 microns), where it would not be possible to pattern a block in the waveguide layer at the same time as the waveguides themselves with a cladding height sufficiently large for alignment purposes. In practice, one would design the circuit to provide local areas where the waveguide separation and density did not exceed a predefined value where alignment would be compromised for the alignment block width in use.

In summary, a method of fabricating a photonic device comprises the steps of providing a core pattern of waveguide core material 1 on a base layer 3 and applying a cladding layer 2 over the core material 1 and the base layer 3. The height of the surface of the cladding layer 2 over the base layer 3 varies in dependence on the pattern of core material 1. The core pattern is designed with at least two reference regions, each having a width w that is selected to provide a peak of the cladding layer 2 with a predetermined height h1 over each reference region. The core pattern is further designed such that a line between the peaks of the reference regions is higher than any intervening peaks of the cladding layer, whereby the peaks of the reference regions provide a vertical alignment reference.

Although this invention has been described in the context of waveguide core material and a cladding layer, the same principle may be applied to any two suitable layers, without departing from the scope of the invention.

The invention claimed is:

1. A method of fabricating a photonic device including at least one waveguide, the method comprising the steps of:
   a) providing a core pattern of waveguide core material on a base layer;
   b) applying a cladding layer over the core material and the base layer, with the height of the surface of the cladding layer over the base layer varying in dependence on the pattern of core material,
   wherein the core pattern is designed with at least two reference regions, each having a width that is selected to provide a peak of the cladding layer with a predetermined height over each reference region, and
   the core pattern is further designed such that a line between the peaks of the reference regions is higher than any intervening peaks of the cladding layer, whereby the peaks of the reference regions provide a vertical alignment reference.

2. A method of fabricating a photonic device as claimed in claim 1, wherein the widths of the reference regions are the same.

3. A method of fabricating a photonic device as claimed in claim 1, wherein the peaks of the reference regions have the same predetermined height over the base layer.

4. A method of fabricating a photonic device as claimed in claim 3, wherein the widths of the reference regions are the same.

5. A method of fabricating a photonic device including at least one waveguide, the method comprising the steps of:
   a) providing a core pattern of waveguide core material on a base layer;
   b) applying a cladding layer over the core material and the base layer, whereby the height of the surface of the cladding layer over the base layer varies in dependence on the pattern of core material,
   wherein the core pattern is designed with at least two reference regions, each having a width that is selected to provide a peak of the cladding layer with a predetermined height over each reference region, and
   the core pattern is further designed such that a line between the peaks of the reference regions is higher than any intervening peaks of the cladding layer, whereby the peaks of the reference regions provide a vertical alignment reference; and
   c) positioning a mounting device in contact with the peaks of both reference regions to locate a component vertically with respect to the waveguide core.

6. A method of fabricating a photonic device including at least one waveguide, the method comprising the steps of:
   a) providing a core pattern of waveguide core material on a base layer;
   b) applying a cladding layer over the core material and the base layer, whereby the height of the surface of the cladding layer over the base layer varies in dependence on the pattern of core material,
   wherein the core pattern is designed with at least two reference regions, each having a width that is selected to provide a peak of the cladding layer with a predetermined height over each reference region, and
   the core pattern is further designed such that a line between the peaks of the reference regions is higher than any intervening peaks of the cladding layer, whereby the peaks of the reference regions provide a vertical alignment reference,
   wherein the peaks of the reference regions have the same predetermined height over the base layer,
   wherein the widths of the reference regions are the same; and
   c) positioning a mounting device in contact with the peaks of both reference regions to locate a component vertically with respect to the waveguide core.

* * * * *